United States Patent
Shingai

(10) Patent No.: US 10,318,053 B2
(45) Date of Patent: Jun. 11, 2019

(54) CONTROL DEVICE FOR ELECTRONIC APPARATUS AND CONTROL METHOD FOR ELECTRONIC APPARATUS

(71) Applicant: SEIKO EPSON CORPORATION, Tokyo (JP)

(72) Inventor: Kosuke Shingai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 127 days.

(21) Appl. No.: 15/441,079

(22) Filed: Feb. 23, 2017

(65) Prior Publication Data

US 2017/0249045 A1    Aug. 31, 2017

(30) Foreign Application Priority Data

Feb. 25, 2016   (JP) .................................. 2016-033790

(51) Int. Cl.
G09G 5/00      (2006.01)
G06F 3/041     (2006.01)
G06F 3/0488    (2013.01)
G06F 9/451     (2018.01)

(52) U.S. Cl.
CPC .......... *G06F 3/0416* (2013.01); *G06F 3/0488* (2013.01); *G06F 3/04886* (2013.01); *G06F 9/451* (2018.02); *G06F 2203/04104* (2013.01); *G06F 2203/04806* (2013.01)

(58) Field of Classification Search
CPC .......................... G06F 3/0416–3/0418; G06F 3/0488–3/04886; G06F 9/451
See application file for complete search history.

(56) References Cited

U.S. PATENT DOCUMENTS

| | | | |
|---|---|---|---|
| 2009/0164936 A1* | 6/2009 | Kawaguchi | G06F 3/0481 715/788 |
| 2011/0074710 A1* | 3/2011 | Weeldreyer | G06F 3/0481 345/173 |
| 2013/0268875 A1* | 10/2013 | Han | G06F 3/0481 715/769 |
| 2014/0082538 A1* | 3/2014 | Hibi | G06F 3/04845 715/769 |

FOREIGN PATENT DOCUMENTS

JP    2015-108901    6/2015

* cited by examiner

*Primary Examiner* — Charles Tseng
(74) *Attorney, Agent, or Firm* — Workman Nydegger

(57) ABSTRACT

A control device for an electronic apparatus including a touch panel display, in which it receives touch operations by setting a predetermined area as a touch area, a display size of an object displayed on the touch panel display is changed by setting a plurality of expanding touch areas as operations with respect to a function of expansion and contraction, and touch-operating intervals of the plurality of expanding touch areas, and the display position of the touch area is changed so as to widen the intervals when a touch operation for narrowing the intervals between the plurality of expanding touch areas more than a predetermined amount is performed.

13 Claims, 16 Drawing Sheets

FIG. 12

| LAYER PARAMETERS / TOUCH AREA | NO OVERLAP | OVERLAP |
|---|---|---|
| MOVING TOUCH AREA | 1 | 1 |
| EXPANSION/CONTRACTION TOUCH AREA | 1 | 2 |

CONTROL DEVICE FOR ELECTRONIC APPARATUS AND CONTROL METHOD FOR ELECTRONIC APPARATUS

BACKGROUND

1. Technical Field

The present invention relates to a control device and a control method for an electronic apparatus; and particularly relates to a control device and a control method for an electronic apparatus which is provided with a touch panel display and which is able to receive touch operations by setting a predetermined area as a touch area.

2. Related Art

Electronic apparatuses which are provided with a touch panel display and which are able to receive touch operations by setting a predetermined area as a touch area are used.

A touch panel display is able to display predetermined images including text, and each image is called an object. In such electronic apparatuses, it is possible to use image editing such as expanding, contracting, or moving each object on the touch panel display. The function of expansion and contraction is generally called scaling.

In the expansion/contraction operation, a quadrangular border surrounding the object image is displayed, a square touch area is set in each of the four corners, and the touch areas are dragged and moved in a diagonal direction. As the distance between the original touch areas narrows or widened, the image of the object is expanded or contracted.

JP-A-2015-108901 is an example of related art.

The touch areas at the four corners approach each other as the image of the object is contracted. Accordingly, when the image becomes sufficiently small, the touch areas are moved close to each other and are adjacent, and if the image is further reduced, the touch areas will overlap each other. Alternatively, it is necessary to prohibit contraction past the point of overlap. It is also difficult to touch each touch area individually in a state where the touch areas are excessively close.

In the invention, it is easy to operate the touch areas.

SUMMARY

An advantage of some aspects of the invention is to provide a control device for an electronic apparatus including a touch panel display, in which receives touch operations by setting a predetermined area as a touch area, a display size of an object displayed on the touch panel display is changed by setting a plurality of touch areas as operations with respect to a function of expansion and contraction and changing interval of the plurality of touch areas by touch operation as operation with respect to a function of expansion and contraction, and a display position of the touch area is changed so as to widen the intervals when a touch operation is performed for narrowing the intervals between the plurality of touch areas more than a predetermined amount.

In the configuration, in the operation with respect to the expansion and contraction function, a plurality of touch areas are set and the plurality of touch areas are touch-operated to change the intervals thereof. For example, when widened, the touch areas expand and when narrowed, the touch areas contract. At a time when the display size of the object displayed on the touch panel display is changed or contracted in this manner, if a touch operation for narrowing the interval between the plurality of touch areas more than a predetermined amount is performed, the intervals of the plurality of touch areas are narrowed, but the display positions of the touch areas are changed and intervals are widened. That is, although the intervals are narrowed, the touch areas are not overlapped or not excessively overlapped since the display position is changed.

BRIEF DESCRIPTION OF THE DRAWINGS

The invention will be described with reference to the accompanying drawings, wherein like numbers reference like elements.

FIG. 12 is a diagram which shows a layer change of the moving touch area and the expansion/contraction touch area.

DESCRIPTION OF EXEMPLARY EMBODIMENTS

First Embodiment

Figure 1:
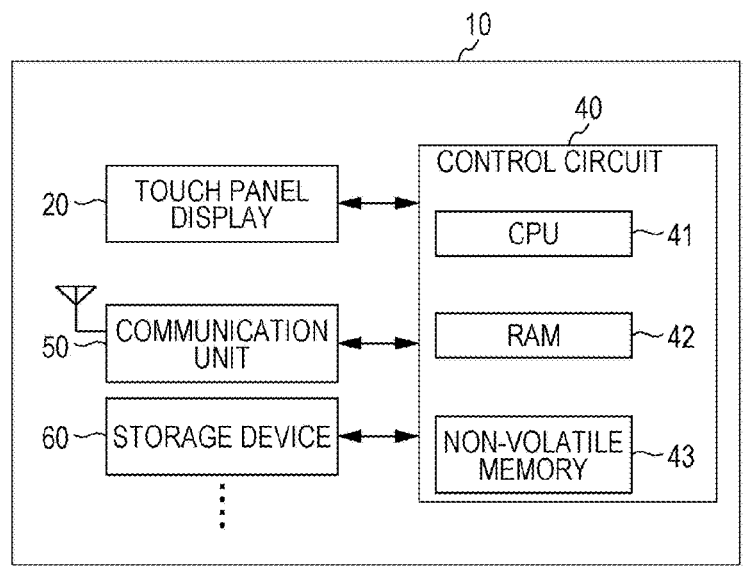
FIG. 1 is a schematic block diagram of an electronic apparatus to which the invention is applied.

Hereinafter, description will be given of the embodiments of the invention with reference to the drawings. FIG. 1 is a block diagram which shows an electronic apparatus to which a control device according to an embodiment of the invention is applied.

In the figure, an electronic apparatus 10 which is a tablet terminal is provided with a touch panel display 20, a control circuit 40, a communication unit 50, and a storage apparatus 60. The control circuit 40 internally includes a CPU 41, a RAM 42, and a non-volatile memory 43. The control circuit 40 executes a program stored in the non-volatile memory 43 or the storage apparatus 60 with the RAM 42 as a work area, and controls the touch panel display 20 and the communication unit 50. Then, various functions provided by the program are realized.

Figure 2:
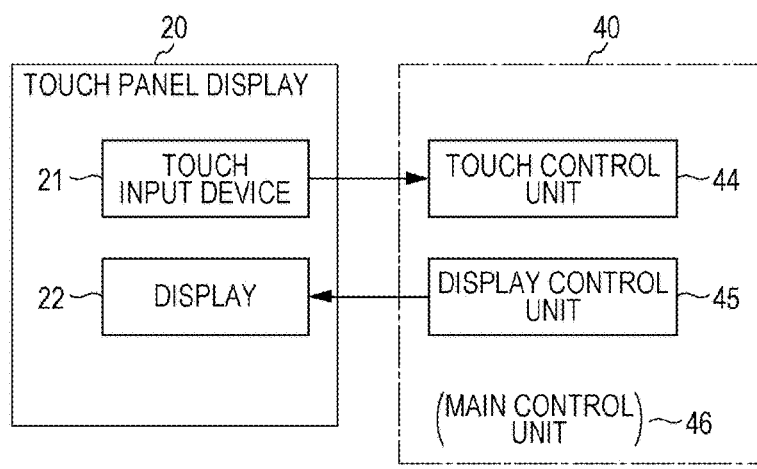
FIG. 2 is a functional block diagram of an electronic apparatus.

FIG. 2 is a functional block diagram of the electronic apparatus 10.

The touch panel display 20 is provided with a touch input apparatus 21 and a display 22, is able to receive touch operations, and displays predetermined images. The control circuit 40 is connected to the touch input apparatus 21 and the display 22, and realizes a touch control unit 44 and a display control unit 45 by executing a predetermined program. The control circuit 40 realizes the functions of a main control unit 46.

Figure 3:
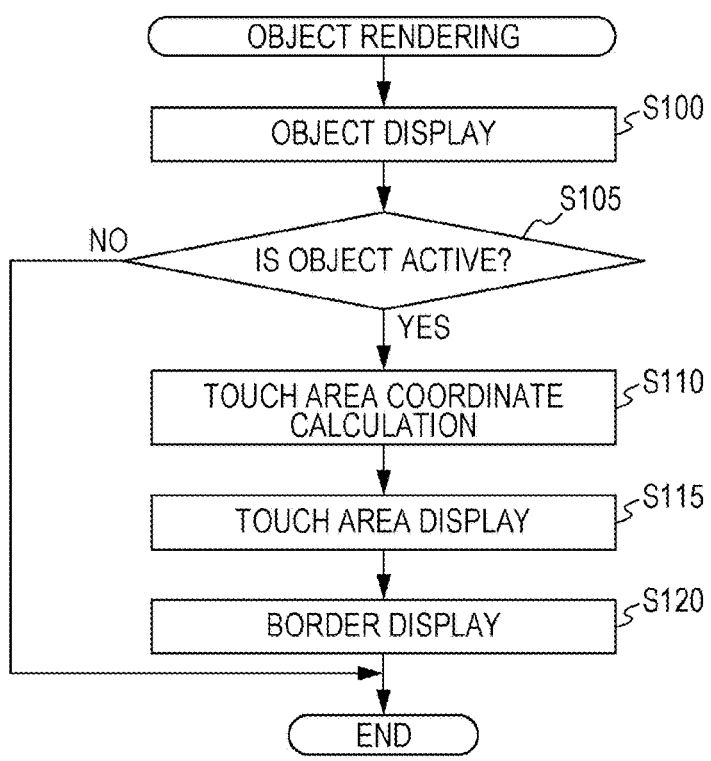
FIG. 3 is a flowchart of object rendering processing.
Figure 4:
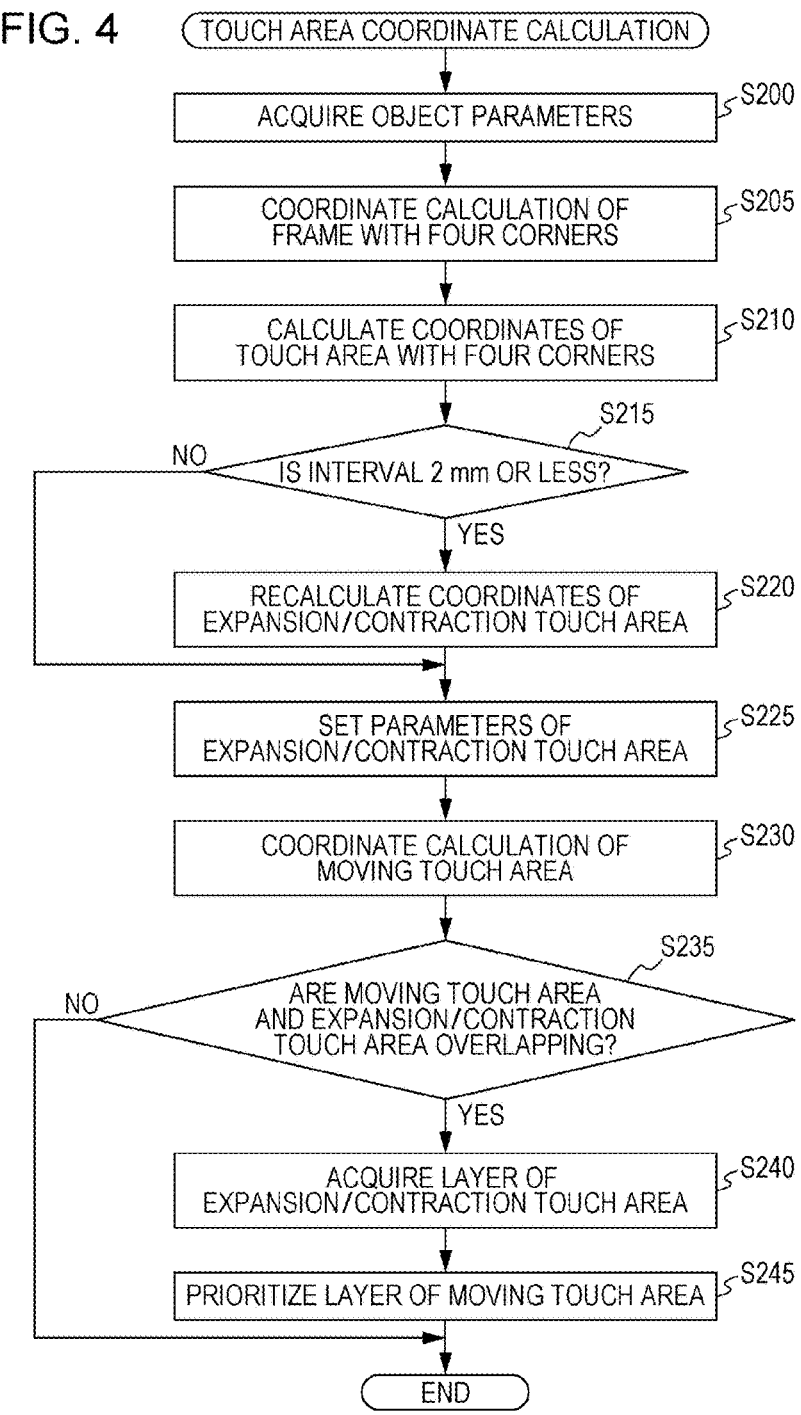
FIG. 4 is a flowchart of touch area coordinate calculation processing.

Next, description will be given of the operation of the present embodiment having the above configuration. FIG. 3 is a flowchart corresponding to object rendering and FIG. 4 is a flowchart corresponding to touch area coordinate calculation.

Figure 5:
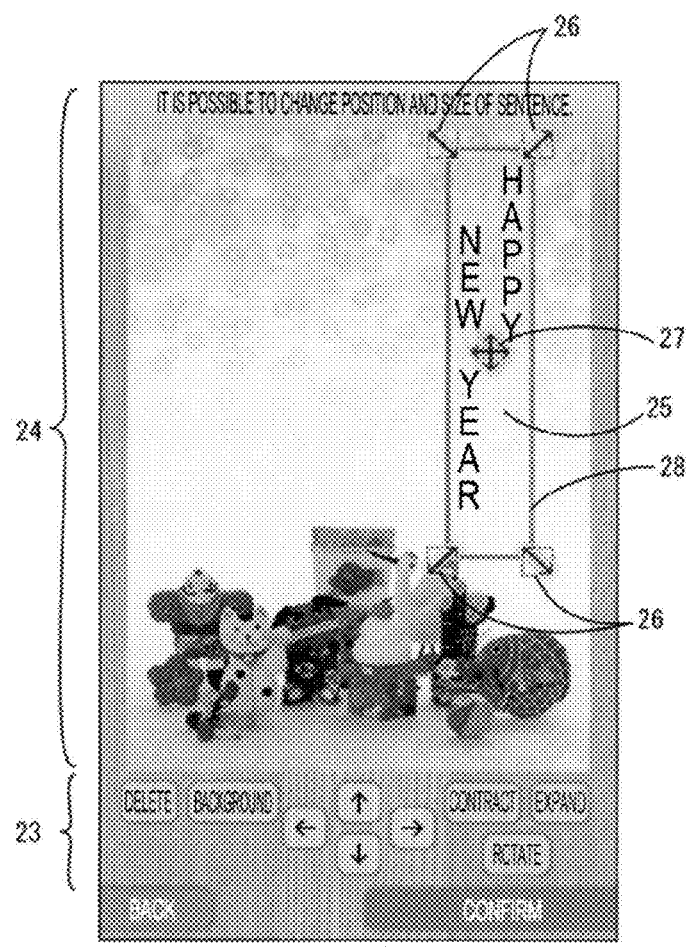
FIG. 5 shows a display example of a touch display.

FIG. 5 shows a display example of the touch display.

The touch panel display 20 is able to display a predetermined image, displays images for operation, and is able to determine a predetermined operation input by receiving a touch operation on the image. In this example, an operation region 23 is arranged below and images are displayed above.

An image corresponds to an illustration, an editable text box, an uneditable illustration character, a background, a photograph, or the like, each of which is managed as a kind of object. In addition to these images, the object includes a border for operation and a touch area.

In the diagram, an editable text box 25, an expansion/contraction touch area 26 for operation, a moving touch area 27, and a border 28 are displayed.

The characters in the text box 25 are able to be edited and are displayed in accordance with the fonts and color sizes specified by the properties, but detailed description thereof will be omitted. The outline of the text box 25 is displayed or not displayed according to the properties, but apart from this, the border 28 is displayed when this object becomes active, and the border 28 is not displayed when the object is inactive. The border 28 is displayed as a rectangle of the smallest size which is able to surround the object. The border 28 is a line indicating a frame of an area set for each object.

At the four corners of the border 28, square expansion/contraction touch areas 26 surrounded by thin lines are displayed, and double-ended arrows pointing diagonally are displayed, respectively. Double-sided arrows indicate the movement direction of the respective expansion/contraction touch areas 26, one of the arrows points to the inside of the border 28, and the other arrow points to the outside of the border 28. This double-ended arrow indicates that a user is able to drag the expansion/contraction touch area 26 in the direction of the arrow, and urges the user to perform this operation for expansion or contraction.

Figure 6:
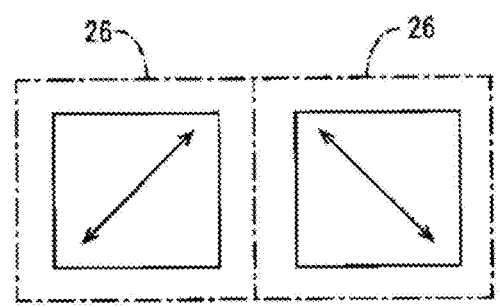
FIG. 6 shows an expansion/contraction touch area alone.

FIG. 6 shows the expansion/contraction touch area alone.

The expansion/contraction touch area 26 is displayed as a square of a certain size according to a predetermined rule. In this example, although displayed as a square of a certain size, a gap can be seen at the periphery of the expansion/contraction touch area 26 when adjacent to another expansion/contraction touch area 26. That is, a thin line square for display is displayed inside the square of the actual touch area. Note that, such a display is merely an example and it is also possible to display the thin line square for display on the outer edge while keeping the size of the square of the actual touch area as it is, so that the gap is not displayed when the square is adjacent.

The moving touch area 27 is displayed substantially at the center of the rectangular border 28. In the moving touch area 27, a thin line diamond which is a square shape rotated by 45 degrees is displayed, and a cross arrow formed with arrows at each end is displayed inside the diamond. This cross arrow indicates that the user can drag the moving touch area 27 in the direction of the arrow and urges the user to carry out operations in the vertical direction and the horizontal direction.

Next, description will be given of a display example in a case where the user performs a touch operation.

Referring to the flowchart of FIG. 3, in order to render an object, the CPU 41 displays an object in S100. This object is the editable text box 25 or the like described above. Next, it is determined whether the object is active in S105. Although the determination as to whether the object is active or not will be described below, in a case of being active, the border 28, the expansion/contraction touch area 26, and the moving touch area 27 are displayed. Therefore, the CPU 41 calculates the coordinates of each touch area in S110. After calculating the coordinates of the touch area, the CPU 41 displays each touch area (26, 27) in S115 and displays the border 28 in S120. Note that, the processing for displaying the expansion/contraction touch area 26 and enabling operations to be received corresponds to the processing for receiving an operation of changing the interval of a plurality of touch areas.

FIG. 4 is a flowchart of processing for calculating touch area coordinates.

Since the coordinates of the touch area depend on the display position of the object, the CPU 41 acquires the parameters of the object (25) in S200. The object (25) is provided with coordinate values indicating the outline on the display. Usually, the object (25) coincides with the coordinate values of the four corners of the border 28. Although the coordinate values of the four corners may be used, usually, on the premise of an XY coordinate system, the object (25) is provided with an upper left (X, Y) coordinate value, a rightward direction width value w, and a downward direction height value h. Based on these pieces of information, the CPU 41 calculates and obtains the coordinates (x0, y0) (x1, y0) (x0, y1) (x1, y1) of the frame with the four corners in S205. After calculating the coordinates of the frame with the four corners, in S210, the coordinates of the four-corner expansion/contraction touch areas 26 are calculated. The expansion/contraction touch area 26 itself is also a rectangular area, and the position and the size are specified by the upper left (X, Y) coordinate value, the rightward direction width value w, and the downward direction height value h. Usually, a calculation is performed in which the position and the size are specified so that the coordinates (x0, y0) (x1, y0) (x0, y1) (x1, y1) of the frame at the four corners of the object are the centers of the respective touch areas. After obtaining the coordinates of the four corners for each of the four corner expansion/contraction touch areas 26, the CPU 41 determines whether the interval is 2 mm or less in S215. As shown in FIG. 6, the interval here refers to the interval at which squares displayed with thin lines are separated to become visible even when in contact as touch areas. Of course, this 2 mm is only an example, and the interval may be selected as appropriate according to the actual size of the touch panel display 20. Note that, the processing for determining whether the interval is 2 mm or less corresponds to a step of determining whether or not the operation is a touch operation for narrowing the intervals between the plurality of touch areas more than a predetermined amount.

Figure 7:
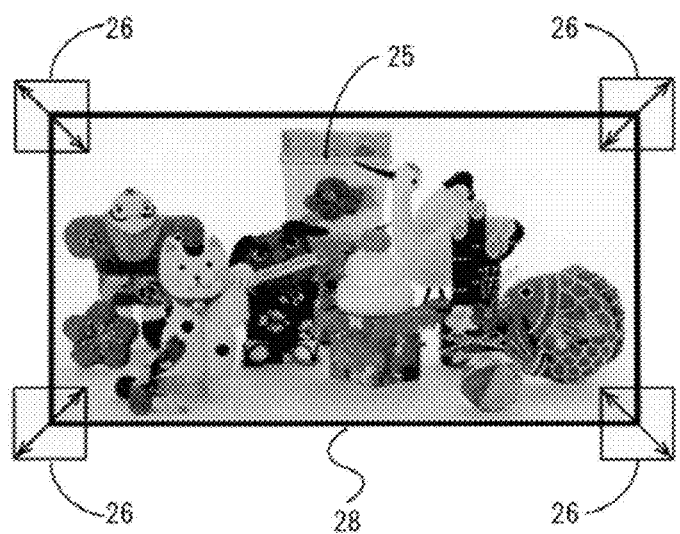
FIG. 7 is a diagram which shows a display of an object before contraction.
Figure 8:
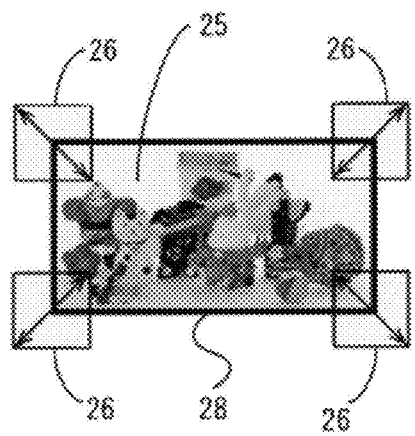
FIG. 8 is a diagram which shows a display of an object being contracted.
Figure 9:
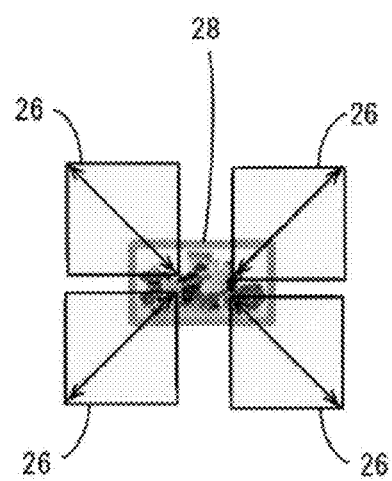
FIG. 9 is a diagram which shows a display of an object after contraction.

Here, FIG. 7 is a diagram which shows the display of the object before contraction, FIG. 8 is a diagram which shows the display of the object being contracted, and FIG. 9 is a diagram which shows the display of the object after contraction. In these figures, diagonal arrows are not added so that the centers of the respective touch areas are easy to understand, and X cross-shaped cross lines are shown connecting opposing diagonal lines.

As shown in FIG. 7, before the contraction, the expansion/contraction touch areas 26 at the four corners are sufficiently separated from each other. In this case, without executing the processing of S220, the coordinates of the expansion/contraction touch areas 26 at the four corners which have already been determined are specified and are set as the parameters of the expansion/contraction touch area in S225. That is, the center of the expansion/contraction touch area 26 at the four corners is determined to be a position which coincides with the coordinates (x0, y0) (x1, y0) (x0, y1) (x1, y1) of the frame at the four corners of the object.

As shown in FIG. 8, the same also applies even during contraction or in a case where the interval is not 2 mm or less in S215.

However, as shown in FIG. 9, when the operation to reduce the object (25) to be very small is performed, the interval becomes 2 mm or less in the calculation in S215. When displayed as it is, the expansion/contraction touch area 26 is displayed in an overlapping manner.

Then, in S220, the CPU 41 recalculates the coordinates of the expansion/contraction touch area. This recalculation is recalculation for shifting the center position so that the interval becomes 2 mm. When the interval is 2 mm, the touch areas are in contact with each other as shown in FIG. 6. For example, as shown in FIG. 6, in the case of rendering a fine line square so as not to have a gap on the display, if it is intended to provide a gap from the viewpoint of the display, the gap is provided before the touch areas come into contact with each other. As described above, the processing for recalculating for shifting the center position so that the interval becomes 2 mm corresponds to the step for changing the display position of the touch areas so as to widen the intervals of the touch areas when it is determined that the touch operation is a touch operation for narrowing the interval between the plurality of touch areas more than a predetermined amount.

In FIG. 9, the four corners of the border 28 do not coincide with the center (with the intersection of the cross lines) of the expansion/contraction touch areas 26.

That is, when a touch operation is performed to narrow the interval between the plurality of expansion/contraction touch areas 26 more than a predetermined amount (here, 2 mm), the display positions of the expansion/contraction touch areas 26 are changed so as to be wider than the original interval. The CPU 41 sets the changed display position as a parameter of the expansion/contraction touch area in S225.

Specifically, in general, the four corner (plurality) expansion/contraction touch areas 26 are arranged at the four corners of the border 28 surrounding the object (25); however, with the border as a reference, the expansion/contraction touch areas 26 are positioned further to the outside with respect to the border 28 when the interval of the expansion/contraction touch areas 26 is less than a predetermined distance (2 mm) than when the interval of the expansion/contraction touch areas 26 is greater than a predetermined distance (2 mm).

In this example, in a case where the touch areas actually overlap each other, the touch areas are rearranged so as not to overlap each other; however, even in such a case, this is just "widening the interval".

Next, the CPU 41 calculates the coordinates of the moving touch area 27 in S230. More specifically, the center of the moving touch area 27 is calculated so as to coincide with the center of the border 28. Although the display is a diamond, the moving touch area 27 itself is also a rectangular area, and the position and size are specified by the upper left (X, Y) coordinate value, the rightward direction width value w, and the downward direction height value h. Normally, calculation is performed which specifies the position and size such that the border or the center of the coordinates (x0, y0), (x1, y0), (x0, y1), (x1, y1) of the frame of the four corners of the object is the center of the touch area.

Next, in S235, the CPU 41 determines whether or not the moving touch area and the expansion/contraction touch area overlap each other.

Figure 10:
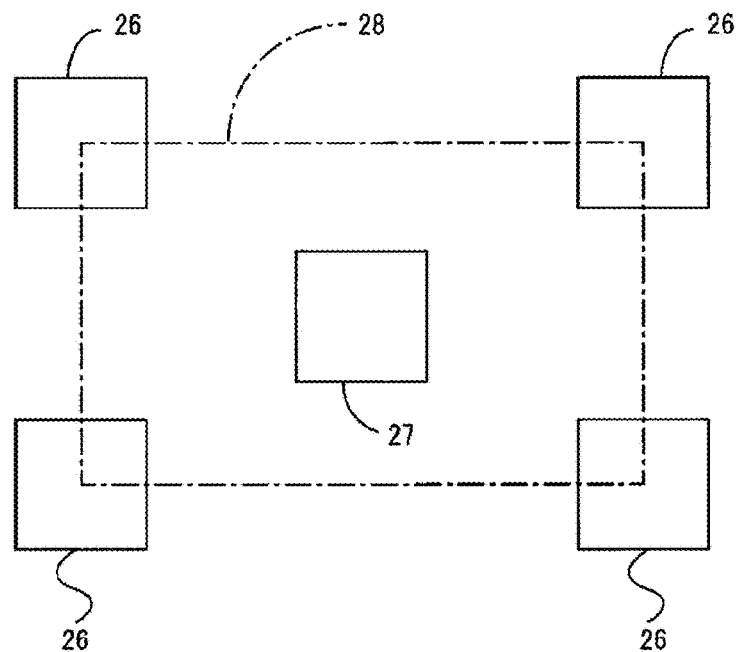
FIG. 10 is a diagram which shows a state before the moving touch area and the expansion/contraction touch area overlap.
Figure 11:
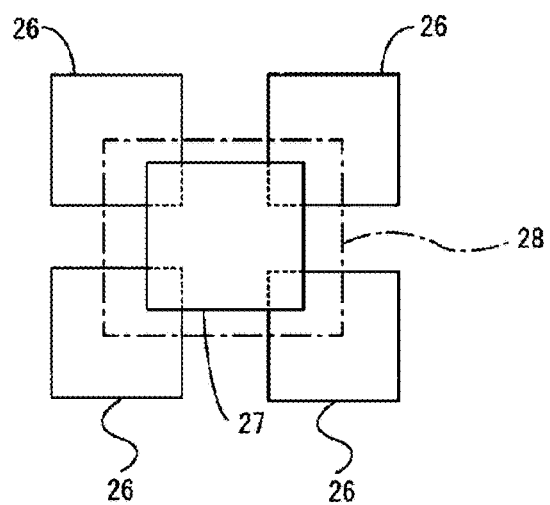
FIG. 11 is a diagram which shows a state after the moving touch area and the expansion/contraction touch area overlap.

FIG. 10 shows a state where the moving touch area and the expansion/contraction touch area are sufficiently separated before overlapping each other and FIG. 11 shows a state after the moving touch area and the expansion/contraction touch area overlap.

In the state shown in FIG. 10, the moving touch area and the expansion/contraction touch area do not overlap each other, and the processing is finished simply by calculating the coordinates.

However, as shown in FIG. 11, when the contraction operation progresses, the expansion/contraction touch areas 26 come into close contact with each other and, as a result, the moving touch areas 27 positioned at the center thereof and the peripheral expansion/contraction touch areas 26 enter a state of overlapping with each other. Whether or not the areas overlap is determined based on the coordinate calculation result.

Then, when it is determined that the moving touch area and the expansion/contraction touch area are overlapped in S235, the CPU 41 acquires the layer of the expansion/contraction touch area 26 in S240, and performs processing for prioritizing the layer of the moving touch area 27 in S245.

When rendering is performed by individually managing a plurality of objects, a layer is a function of prioritizing a display in a case where these are overlapped, and the layers are managed by parameters. The smaller the parameter of the layer is, the higher the layer is, that is, the higher the priority, and in a case of overlapping, lower objects will be hidden from the display by the upper objects.

FIG. 12 is a diagram which shows a layer change of the moving touch area and the expansion/contraction touch area.

As shown in the figure, in a case where there is no overlap, the same priority "1" is set as a layer parameter in the moving touch area 27 and the expansion/contraction touch area 26.

In the state shown in FIG. 10, the moving touch area and the expansion/contraction touch area do not overlap each other, and the layer parameters are not changed just as a result of the coordinate calculation. However, as shown in FIG. 11, when the moving touch area 27 and the expansion/contraction touch area 26 are in an overlapping state, processing for prioritizing the layer of the moving touch area 27 is performed. In order to carry out the prioritization, the parameter of the layer of the moving touch area 27 is decreased or the parameter of the layer of the expansion/contraction touch area 26 is increased. The example shown in FIG. 12 corresponds to the latter, the parameter of the layer of the moving touch area 27 is set as it is to "1", the parameter of the layer of the expansion/contraction touch area 26 is increased to "2" and the priority of the layer of the expansion/contraction touch area 26 is lowered as a result.

As a result of increasing the priority of the moving touch area 27, as shown in FIG. 11, the moving touch area 27 is properly displayed, and the part of the expansion/contraction touch area 26 which is dropped to be lower is hidden and not visible. When the moving touch area 27 is dropped downward, the four corners are covered with the expansion/contraction touch area 26, it becomes extremely difficult to touch-operate the moving touch area 27 thereafter and, as a result, the moving touch area 27 is no longer able to be moved. On the other hand, even in a case where the expansion/contraction touch area 26 is dropped down, since only one of the four corners is covered by the moving touch area 27, the remaining portion continues to be displayed sufficiently and it is possible to touch and operate the expansion/contraction touch area 26.

Second Embodiment

In the second embodiment, the operability is improved in a case where large and small objects overlap.

Figure 13:
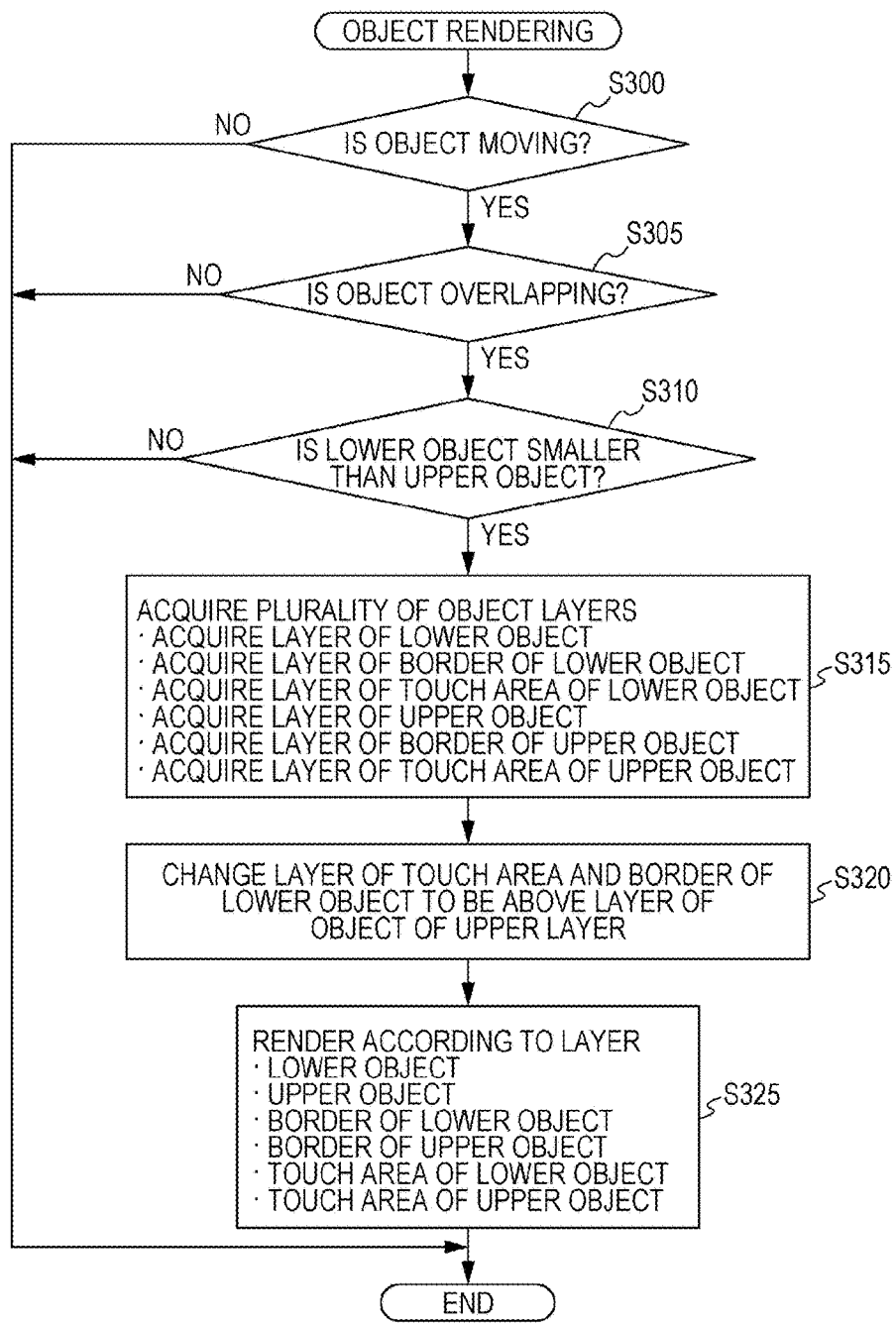
FIG. 13 is a flow chart of object rendering processing in a case where large and small objects overlap.

FIG. 13 is a flowchart of object rendering processing when large and small objects overlap.

Figure 14:
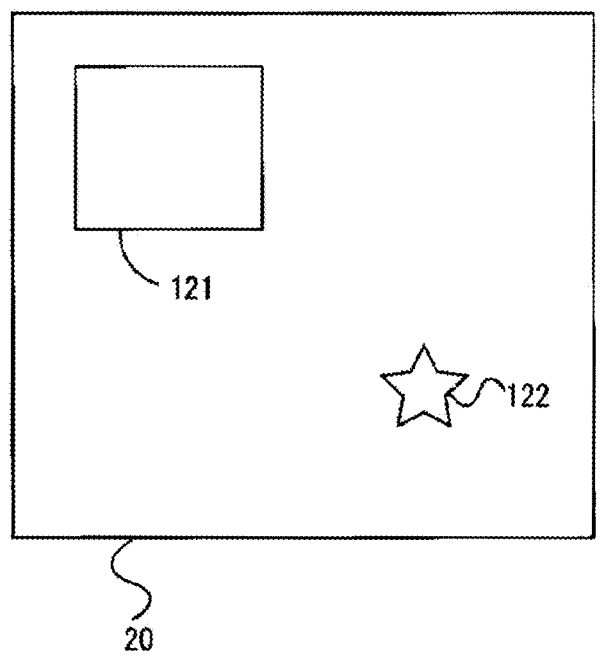
FIG. 14 is a diagram which shows a display before large and small objects overlap.
Figure 15:
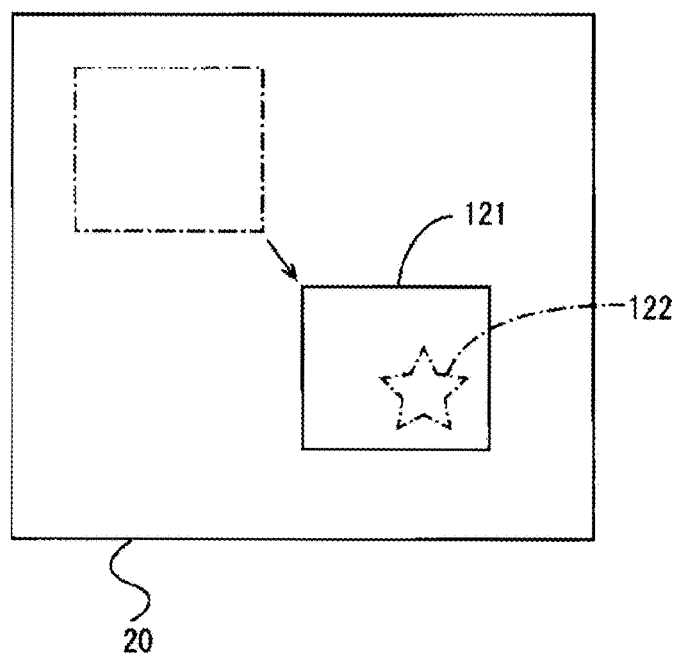
FIG. 15 is a diagram which shows a display immediately after large and small objects overlap.
Figure 16:
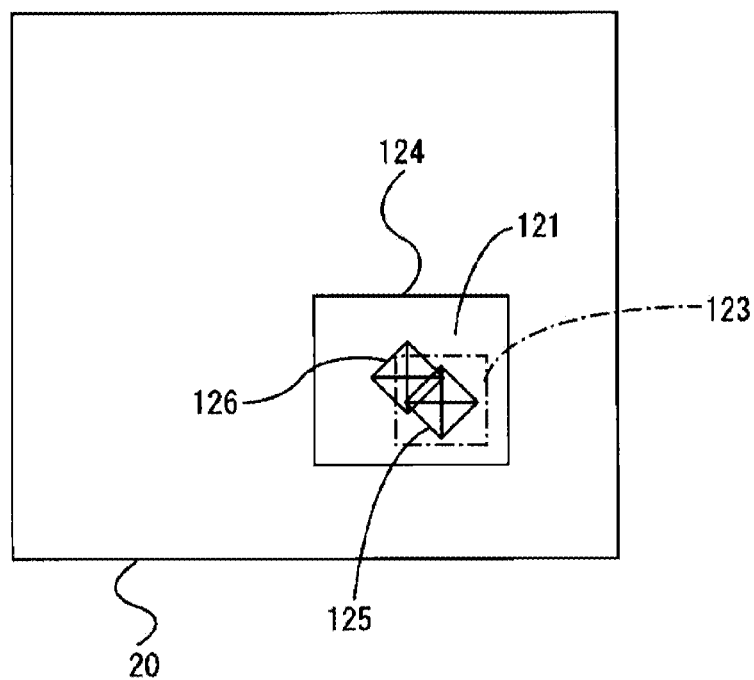
FIG. 16 is a diagram which shows a display with improved operability after large and small objects overlap.

In addition, FIG. 14 is a diagram which shows a display before large and small objects overlap, FIG. 15 is a diagram which shows display immediately after the overlapping of large and small objects, and FIG. 16 is a diagram which shows a display in which the operability is improved after large and small objects overlap.

Referring to the flowchart of FIG. 13, when the CPU 41 determines that there is object movement in S300, the CPU 41 further determines whether or not there is an overlap of objects in S305 and, when there is an overlap, further determines whether the bottom object is smaller than the top object in S310. When all these conditions are satisfied, since the processing of S315 and the following steps are executed, the order of the condition determination is not important. As a result, it is determined that a small object is in a state of being placed under the object having a large display area.

Under such conditions, not only is the small object below not displayed, but it is also impossible to operate this small object. Normally, after moving a large object temporarily to eliminate the overlap, making the small object accessible, and performing a desired operation, the large object is returned again to the original position thereof, but this is cumbersome and time-consuming.

In S315, the CPU 41 acquires information on the object, the touch area, and the border layer. That is, the following are executed: • Acquire the layer of the lower object • Acquire the layer of the border of the lower object • Acquire the layer of the touch area of the lower object • Acquire the layer of the upper object • Acquire the layer of the border of the upper object • Acquire the layer of the touch area of the upper object.

In the example shown in FIG. 14, a large object 121 of a rectangular picture as an illustration and a small object 122 of a star picture as an illustration are displayed on the touch panel display 20. As shown in FIG. 15, the moving touch area 27 (not shown) of the large object 121 is dragged and moved to a position overlapping the small object 122.

In this state, it is determined that the small object is placed under the object with a large display region, and the CPU 41 answers "YES" in all determinations in S300 to S310 and carries out step S315.

An object such as an illustration is displayed and a border indicating the area thereof is displayed thereon and, in this state, the touch area for operation should be displayed.

Accordingly, as an example, • the layer of the lower object is 6, • the layer of the border of the lower object is 5, • the layer of the touch area of the lower object is 4, • the layer of the upper object is 3, • the object of the border of the upper object is 2, and • the layer of the touch area of the upper object is 1.

However, in this state, as a result of displaying the large upper object 121, the border and the touch area are not displayed in relation to the small lower object 122 of which the layer is 3 or more. The surface is the same as if there is no small object 122 thereon, and if it is desired to carry out an operation, it is necessary to move the upper object 121.

As described above, in a case where a plurality of objects of different sizes overlap each other, the CPU 41 changes the touch area of the lower object and the layer of the border to be higher than the layer of the object of the upper layer in S320. At least the layer of the touch area set for each is changed and the layer of the touch area for operation on the lower layer object is set above the object on the upper layer. As a result, it is possible to touch-operate the touch area of the object of the lower layer.

More specifically, • the layer of the lower object may be 6, • the layer of the border of the lower object may be 4, • the layer of the touch area of the lower object may be 2, • the layer of the upper object may be 5, • the layer of the border of the upper object may be 3, and • the layer of the touch area of the upper object may be 1.

After changing the layers, in accordance with the layers, the CPU 41 renders according to the layers in S325. In this example: • the lower object 121, • the upper object 122, • a border 123 of the lower object 121, • a border 124 of the upper object 122, • a touch area 125 of the lower object 121, and • a touch area 126 of the upper object 122 are rendered; however, since the layer of the upper object 122 is 5, although the lower object 121 is not rendered, in addition to the border 124 and the touch area 126 of the upper object 122, the border 123 and the touch area 125 of the lower object 121 are also displayed. Then, since the layer of the touch area 125 of the lower object 121 is 2, it is also possible to perform operations such as movement.

Here, in the rendering, only the moving touch area at the center of each object is displayed, but the respective expanding touch areas are also displayed.

In this example, all of the layers of the touch area 125 of the lower object 122 are changed; however, only the minimum touch area may be displayed for the lower object 122. For example, only the moving touch area may be displayed or the expanding touch area may be displayed but the layer may be set not to change when at a position overlapping the touch area of the upper object 121. In this manner, the touch areas are not lined up to be close to each other, and operability is improved.

Alternatively, if the layer of the border is not changed, it is also possible to set the layers as follows: • the layer of the lower object is 6, • the layer of the border of the lower object is 5, • the layer of the touch area of the lower object is 3, • the layer of the upper object is 4, • the layer of the border of the upper object is 2, and • the layer of the touch area of the upper object is 1.

Third Embodiment

The third embodiment shows an improved example of active determination of an object.

Figure 17:
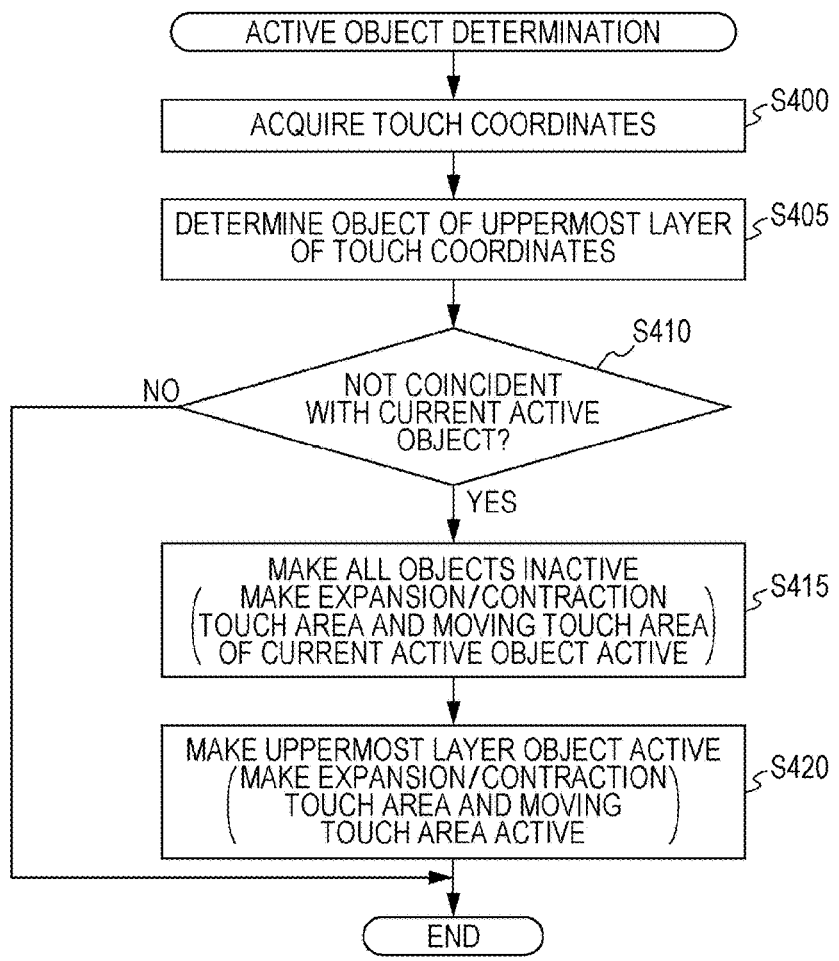
FIG. 17 is a flowchart of processing for determining an active object.

FIG. 17 is a flowchart of processing for active determination of an object.

Figure 18:
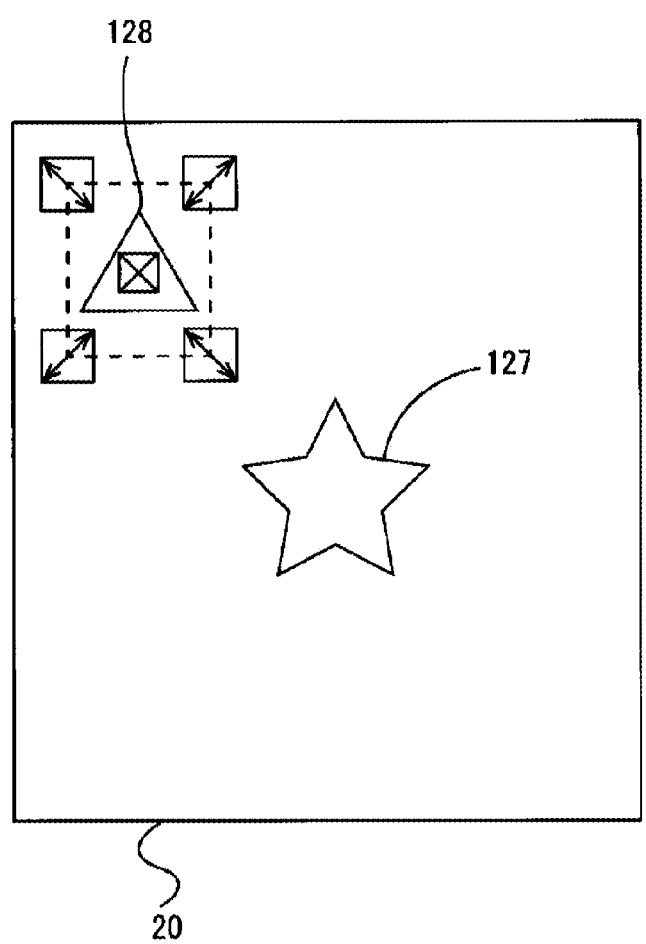
FIG. 18 is a diagram which shows a display of a plurality of objects before touching.
Figure 19:
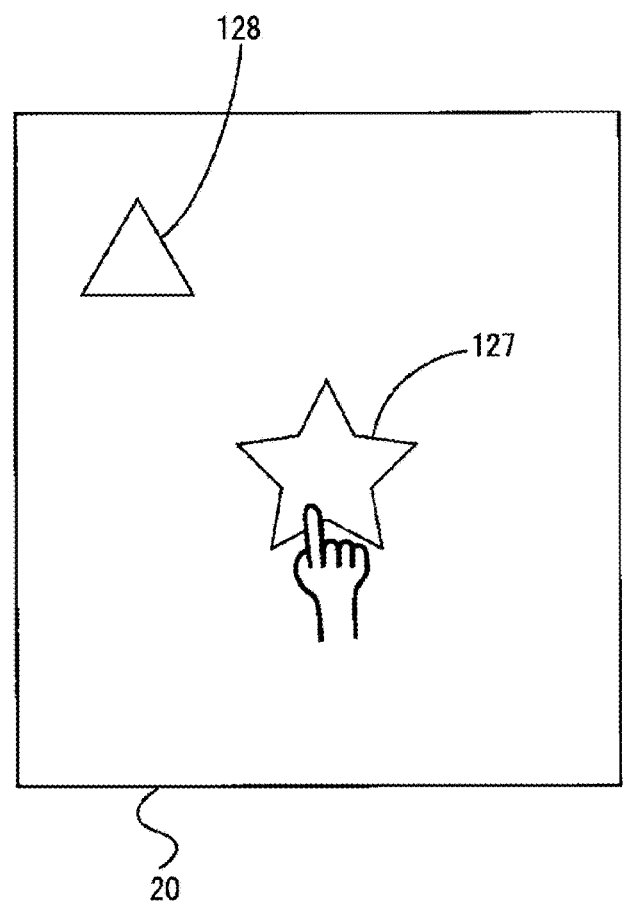
FIG. 19 is a diagram which shows a display of a plurality of objects during touching of the other object.
Figure 20:
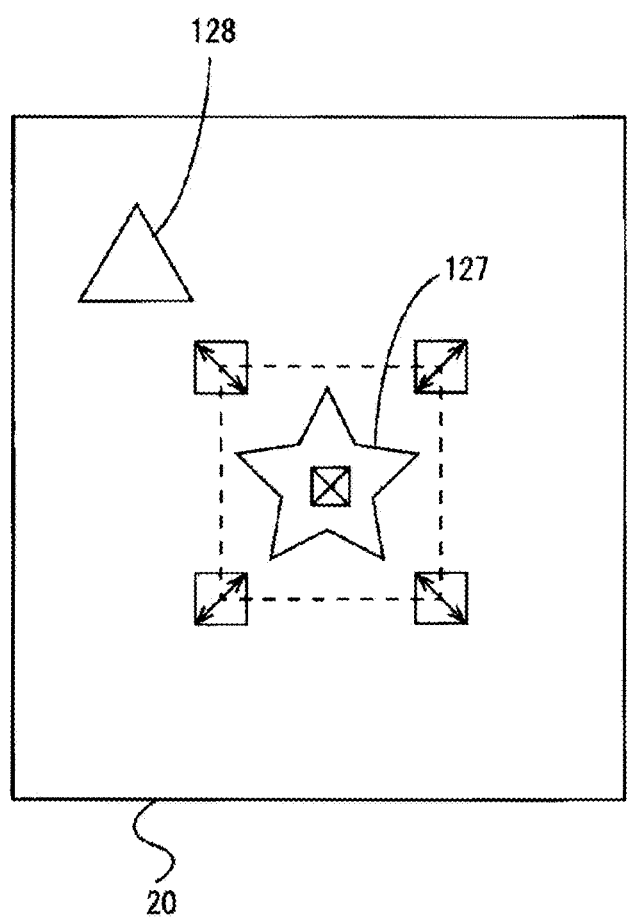
FIG. 20 is a diagram which shows a display of a plurality of objects after touching the other object.
Figure 21:
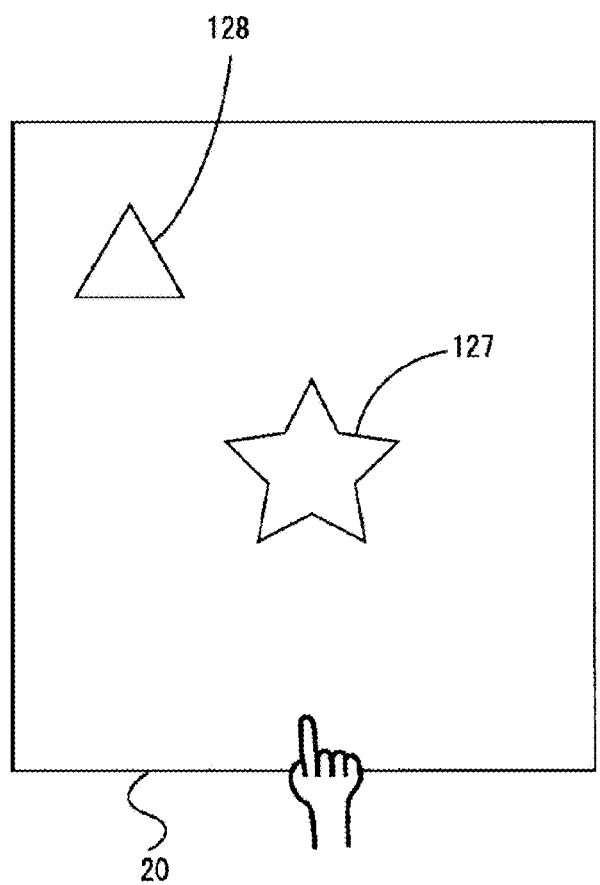
FIG. 21 is a diagram which shows a display after a plurality of objects out of the frame are touched.

In addition, FIG. 18 to FIG. 21 show display examples according to the active determination according to this flowchart, FIG. 18 shows a display before touching a plurality of objects, FIG. 19 shows the display during touching the other of the plurality of objects, FIG. 20 shows the display after touching the other of the plurality of objects, and FIG. 21 shows the display after touching outside the frame of the plurality of objects.

In the state shown in FIG. 18, a star-shaped illustration object 127 and a triangular illustration object 128 are displayed on the touch panel display 20, and the triangular illustration object 128 is active. A border and a touch area for operation are displayed on the active object. From this state, it is assumed that the inactive star-shaped illustration object 127 is touch-operated as shown in FIG. 19. Whether or not the object is touch-operated is determined by whether or not a region set in the object is touch-operated, that is, whether or not somewhere in the border, if active, is touch-operated.

Referring to the flowchart of FIG. 17, the CPU 41 acquires the touch coordinates in S400 and determines the object of the uppermost layer of the touch coordinates in S405. The CPU 41 manages information regarding the coordinate positions and layers for all the objects, and determines an object corresponding to the touch coordinates, giving priority to the uppermost layer. As a result, it is possible to determine that the object is the inactive star-shaped illustration object 127.

Since the object that was active before touching was the triangular illustration object 128, the CPU 41 determines that the object is not coincident with the current active object in S410, and makes all objects inactive in S415. This is done in consideration of cases where there is no object in the touched region, and it is possible to deactivate all the objects at one time by touching a region other than the active object. As a result, the expansion/contraction touch area and the moving touch area of the current active object become active.

FIG. 21 shows a display after touching a plurality of objects outside the frame. In this example, all the objects are inactive since a region where no object is arranged is touched.

On the other hand, when the star-shaped illustration object 127 is touch-operated, the CPU 41 makes this uppermost layer object active in S420. FIG. 20 shows this state, and the star-shaped illustration object 127 which was touch-operated is activated, and the border, the expansion/contraction touch area and the moving touch area are activated and displayed.

In this manner, when a touch operation is performed in the frame set for the object, the expanding touch area (the first touch area) and the moving touch area (the second touch area) of this object are changed to an operable state, and when a touch operation is performed in the region outside the frame, the expanding touch area (first touch area) and the moving touch area (second touch area) of this object are changed to a non-operable state.

Here, the invention is naturally not limited to the above embodiments. As a matter of course, those skilled in the art will appreciate that the following are disclosed as embodiments of the invention.

application by appropriately changing the mutually replaceable members and configurations and the like disclosed in the above embodiments and combinations thereof application by appropriately replacing mutually replaceable members, configurations, and the like disclosed in the embodiments described above, using well-known techniques which are not disclosed in the embodiments, or changing the combinations thereof application by appropriately replacing members, configurations, and the like conceivable by those skilled in the art as substitutes for the members, configurations, and the like disclosed in the embodiments based on well-known techniques which are not disclosed in the embodiments, or changing the combinations thereof.

The entire disclosure of Japanese Patent Application No. 2016-033790 filed Feb. 25, 2016 is expressly incorporated by reference herein.

What is claimed is:

1. A control device for an electronic apparatus comprising:
    a touch panel display and a processor for executing a program to control the touch panel display,
    wherein the touch panel display receives touch operations by setting a predetermined area as a touch area, wherein a display size of an object displayed on the touch panel display is changed by setting a plurality of touch areas and changing intervals of the plurality of touch areas by the touch operations with respect to a function of expansion and contraction,
    wherein display positions of the plurality of touch areas are changed so as to widen the intervals when a touch operation for narrowing the intervals between the plurality of touch areas more than a predetermined amount is performed, and
    wherein the plurality of touch areas are arranged at four corners of a frame which surrounds the object, the frame is set as a reference, and the plurality of touch areas are positioned further outside of the frame when the intervals between the plurality of touch areas are smaller than a predetermined distance than when the intervals between the plurality of touch areas are greater than the predetermined distance.

2. The control device for the electronic apparatus according to claim 1,
    wherein the processor sets layers and, with respect to the object, the processor sets first touch areas from the plurality of touch areas with respect to the expansion and contraction function and a second touch area from the plurality of touch areas with respect to a moving function, and
    when the intervals of the first touch areas are smaller than the predetermined distance, a layer of the second touch area has priority over a layer of the first touch areas.

3. The control device for the electronic apparatus according to claim 1, wherein the processor sets layers and wherein the object is one of a plurality of objects with different sizes, and in a case where the plurality of objects with different sizes overlap, a layer of the plurality of touch areas set for each of the plurality of objects is changed, and a layer of the plurality of touch areas for operation of an object of a lower layer is set to be above an object of an upper layer.

4. The control device for the electronic apparatus according to claim 1, wherein, when a touch operation is performed inside a frame set on the object, a first touch area and a second touch area of the plurality of touch areas are changed to an operable state, and when a touch operation is performed in a region outside the frame, the first touch area and the second touch area are changed to a non-operable state.

5. The control device for the electronic apparatus according to claim 1, further comprising:
   a display control unit which displays a predetermined image on the touch panel display;
   a touch control unit which is able to receive the touch operations by setting predetermined areas on the touch panel display as the plurality of touch areas; and
   a main control unit which displays the predetermined image as the object on the touch panel display using the display control unit and which controls changes in the object by receiving the touch operations on the touch panel display using the touch control unit.

6. A control method for an electronic apparatus which is provided with a touch panel display which receives touch operations by setting a predetermined area as a touch area and a processor for executing a program to control the touch panel display, the electronic apparatus changing a display size of an object displayed on the touch panel display by setting a plurality of touch areas and changing intervals of the plurality of touch areas by the touch operations with respect to a function of expansion and contraction, the method comprising:
   receiving an operation for changing the intervals of the plurality of touch areas;
   determining whether the received operation is a touch operation for narrowing the intervals of the plurality of touch areas more than a predetermined amount; and
   changing display positions of the plurality of touch areas such that the intervals of the plurality of touch areas are widened when the received operation is determined to be the touch operation for narrowing the intervals of the plurality of touch areas more than the predetermined amount,
   wherein the plurality of touch areas are arranged at four corners of a frame which surrounds the object, the frame is set as a reference, and the plurality of touch areas are positioned further outside of the frame when the intervals between the plurality of touch areas are smaller than a predetermined distance than when the intervals between the plurality of touch areas are greater than the predetermined distance.

7. The control method for the electronic apparatus according to claim 6,
   wherein the processor sets layers and, with respect to the object, the processor sets first touch areas from the plurality of touch areas with respect to the expansion and contraction function and a second touch area from the plurality of touch areas with respect to a moving function, and
   when the intervals of the first touch areas are smaller than the predetermined distance, a layer of the second touch area has priority over a layer of the first touch areas.

8. The control method for the electronic apparatus according to claim 6, wherein the processor sets layers and wherein the object is one of a plurality of objects with different sizes, in a case where the plurality of objects with different sizes overlap, a layer of the plurality of touch areas set for each of the plurality of objects is changed, and a layer of the plurality of touch areas for operation of an object of a lower layer is set to be above an object of an upper layer.

9. The control method for the electronic apparatus according to claim 6, wherein, when a touch operation is performed inside a frame set on the object, a first touch area and a second touch area of the plurality of touch areas are changed to an operable state, and when a touch operation is performed in a region outside the frame, the first touch area and the second touch area are changed to a non-operable state.

10. A control device for an electronic apparatus comprising:
    a touch panel display and a processor for executing a program to control the touch panel display,
    wherein the touch panel display receives touch operations by setting a predetermined area as a touch area,
    wherein a display size of an object displayed on the touch panel display is changed by setting a plurality of touch areas and changing intervals of the plurality of touch areas by the touch operations with respect to a function of expansion and contraction,
    wherein the processor sets layers and, with respect to the object, the processor sets first touch areas from the plurality of touch areas with respect to the expansion and contraction function and a second touch area from the plurality of touch areas with respect to a moving function, and
    when the intervals of the first touch areas are smaller than a predetermined distance, a layer of the second touch area has priority over a layer of the first touch areas.

11. The control device for the electronic apparatus according to claim 10, wherein display positions of the plurality of touch areas are changed so as to widen the intervals when a touch operation for narrowing the intervals between the plurality of touch areas more than a predetermined amount is performed.

12. A control device for an electronic apparatus comprising:
    a touch panel display and a processor for executing a program to control the touch panel display,
    wherein the touch panel display receives touch operations by setting a predetermined area as a touch area,
    wherein a display size of an object displayed on the touch panel display is changed by setting a plurality of touch areas and changing intervals of the plurality of touch areas by the touch operations with respect to a function of expansion and contraction,
    wherein, when a touch operation is performed inside a frame set on the object, a first touch area and a second touch area of the plurality of touch areas are changed to an operable state, and when a touch operation is performed in a region outside the frame, the first touch area and the second touch area are changed to a non-operable state.

13. The control device for the electronic apparatus according to claim 12, wherein display positions of the plurality of touch areas are changed so as to widen the intervals when a touch operation for narrowing the intervals between the plurality of touch areas more than a predetermined amount is performed.

* * * * *